(12) United States Patent
Edberg et al.

(10) Patent No.: US 8,205,565 B2
(45) Date of Patent: Jun. 26, 2012

(54) APPARATUS AND METHOD FOR INJECTING WASTE TIRES THROUGH THE BURNER END OF A KILN

(75) Inventors: Roy L. Edberg, Houston, TX (US); Derek Thorington, New Braunfels, TX (US); Gary Pinault, Marion, TX (US); Bryan Martin, New Braunfels, TX (US); Victor Garza, Mission, TX (US)

(73) Assignee: Cemex, Inc., Houston, TX (US)

( * ) Notice: Subject to any disclaimer, the term of this patent is extended or adjusted under 35 U.S.C. 154(b) by 173 days.

(21) Appl. No.: 11/072,469

(22) Filed: Mar. 4, 2005

(65) Prior Publication Data
US 2007/0269292 A1    Nov. 22, 2007

(51) Int. Cl.
*F23G 5/00* (2006.01)
*B65G 25/00* (2006.01)
*F23K 3/00* (2006.01)
*A47J 36/00* (2006.01)

(52) U.S. Cl. ..... 110/346; 414/160; 110/247; 110/101 R; 110/246; 110/267

(58) Field of Classification Search ................. 110/246, 110/267, 116, 117, 101 C, 101 R; 414/160; 432/117; 241/236; 106/745; 198/443, 624, 198/459.8, 461.1–3, 461.2, 577, 596, 792
See application file for complete search history.

(56) References Cited

U.S. PATENT DOCUMENTS

| | | | | |
|---|---|---|---|---|
| 2,696,978 A | * | 12/1954 | Siegel | 432/34 |
| 3,116,924 A | * | 1/1964 | Huck | 271/182 |
| 3,597,852 A | * | 8/1971 | McCollough, Jr. | 34/68 |
| 3,889,798 A | * | 6/1975 | Jurgens et al. | 198/624 |
| 4,025,061 A | * | 5/1977 | Frei | 266/249 |
| 5,400,894 A | * | 3/1995 | Smith | 198/347.2 |
| 5,433,573 A | * | 7/1995 | Buta et al. | 414/208 |
| 5,473,998 A | * | 12/1995 | Allen et al. | 110/247 |
| 5,564,349 A | | 10/1996 | Hartington | |
| 5,938,433 A | * | 8/1999 | Stimson et al. | 432/105 |
| 6,747,379 B2 | * | 6/2004 | LaBrush | 310/51 |

FOREIGN PATENT DOCUMENTS

JP    3274384    * 12/1991

* cited by examiner

*Primary Examiner* — Kenneth Rinehart
*Assistant Examiner* — Timothy K Trieu
(74) *Attorney, Agent, or Firm* — Locke Lord LLP

(57) ABSTRACT

A device is provided for accelerating and propelling whole tires into the combustion zone of a kiln. More specifically, the device comprises an upper accelerating assembly and a lower accelerating assembly for providing approximately constant exit velocity to a whole tire regardless of its size or weight.

6 Claims, 5 Drawing Sheets

APPARATUS AND METHOD FOR INJECTING WASTE TIRES THROUGH THE BURNER END OF A KILN

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

This disclosure relates generally to an apparatus and method for delivering secondary fuel in the form of waste material to a kiln, and more particularly to an apparatus and method of propelling waste tires into the burner end of a cement kiln.

2. Description of the Related Art

Direct fired kilns, such as kilns used in the manufacture of cement clinker, use considerable amounts of energy, usually derived from conventional oil, gas, or coal fuels, to reach the temperatures necessary to achieve the desired results. These primary energy costs account for a large portion of the cost to produce the end product, such as cement, mortar or concrete. Because of this, industry has attempted to exploit secondary fuel sources to obtain savings in the total fuel costs and/or to reduce undesired emissions of the combustion process.

For example, it is well known in the cement industry to use waste or worn rubber tires as secondary or alternative fuel in a kiln. Cement kilns can be effectively operated using waste tires as a significant portion of the total fuel burden without adversely affecting the quality of the clinker produced. Waste tires provide a relatively inexpensive source of secondary fuel. Moreover, disposal of waste tires is increasingly becoming a major environmental issue as well as a health issue due to their role in the breeding of mosquitoes and other pests.

U.S. Pat. No. 5,564,349, entitled "Appartus for Shooting Whole Automobile Tires into a Kiln" purportedly discloses a device comprising a gun barrel, a charging device for placing automobile tires in the gun barrel, and a device for generating compressed air for propelling the automobile tire through the gun barrel. The gun barrel consists of a tube having a cross-section, which is essentially rectangular over its entire length. By designing the gun barrel with a cross-section which corresponds to the cross-section of the automobile tire, the automobile tire will fill out the entire cross-sectional area of the gun barrel thereby making it possible to provide an air pressure behind the automobile tire which is sufficient for propelling the tire through the gun barrel an into the burning zone of the kiln.

U.S. Pat. No. 5,433,573, entitled "Apparatus for Injecting Fuel into Kilns and the Like" purportedly discloses a device comprising two rubber tires rotating in opposite directions, at least one motor for rotating the tires, an entrance chute, and an exit chute. The tires rotate about horizontal and parallel axes that are in an inclined plane and spaced such that the outer radial surfaces of the tires are generally adjacent. The entrance chute has a vertical inlet portion for receiving the fuel pieces and downwardly accelerating the fuel pieces by gravity and an outlet portion open adjacent the tires for feeding the fuel pieces between the tires. The tires elastically deform around the various size fuel pieces and project them as the tires rotate. The exit chute has an axis perpendicular to the inclined plane of the tire axes for directing the projected fuel pieces through the kiln end inlet. The apparatus also includes mechanisms for making adjustments to: the inclination of projection; the windage of projection; and the spacing between the tires.

This application for patent discloses and claims an apparatus for mechanically accelerating and delivering whole waste tires into the burning zone of a kiln from the discharge end.

BRIEF SUMMARY OF THE INVENTION

One aspect of this invention provides a device for propelling whole waste tires, comprising a lower accelerating assembly comprising a plurality of rotatable elements, each element having an axis of rotation substantially normal to an intended flight path of the tire, an upper accelerating assembly comprising a plurality of rotatable elements, each element having an axis of rotation substantially normal to an intended flight path of the tire, at least one prime mover for supplying rotational energy to the upper and lower accelerating assemblies for rotating in opposite directions at least one of the upper elements and at least one of the lower elements; and a frame having a lower portion supporting the lower accelerating assembly, an upper portion supporting the upper accelerating assembly and an intermediate portion for locating the upper assembly a predetermined distance from the lower assembly so that the tire is accelerated by the oppositely rotating elements and propelled substantially along a predetermined trajectory.

Figure 1:
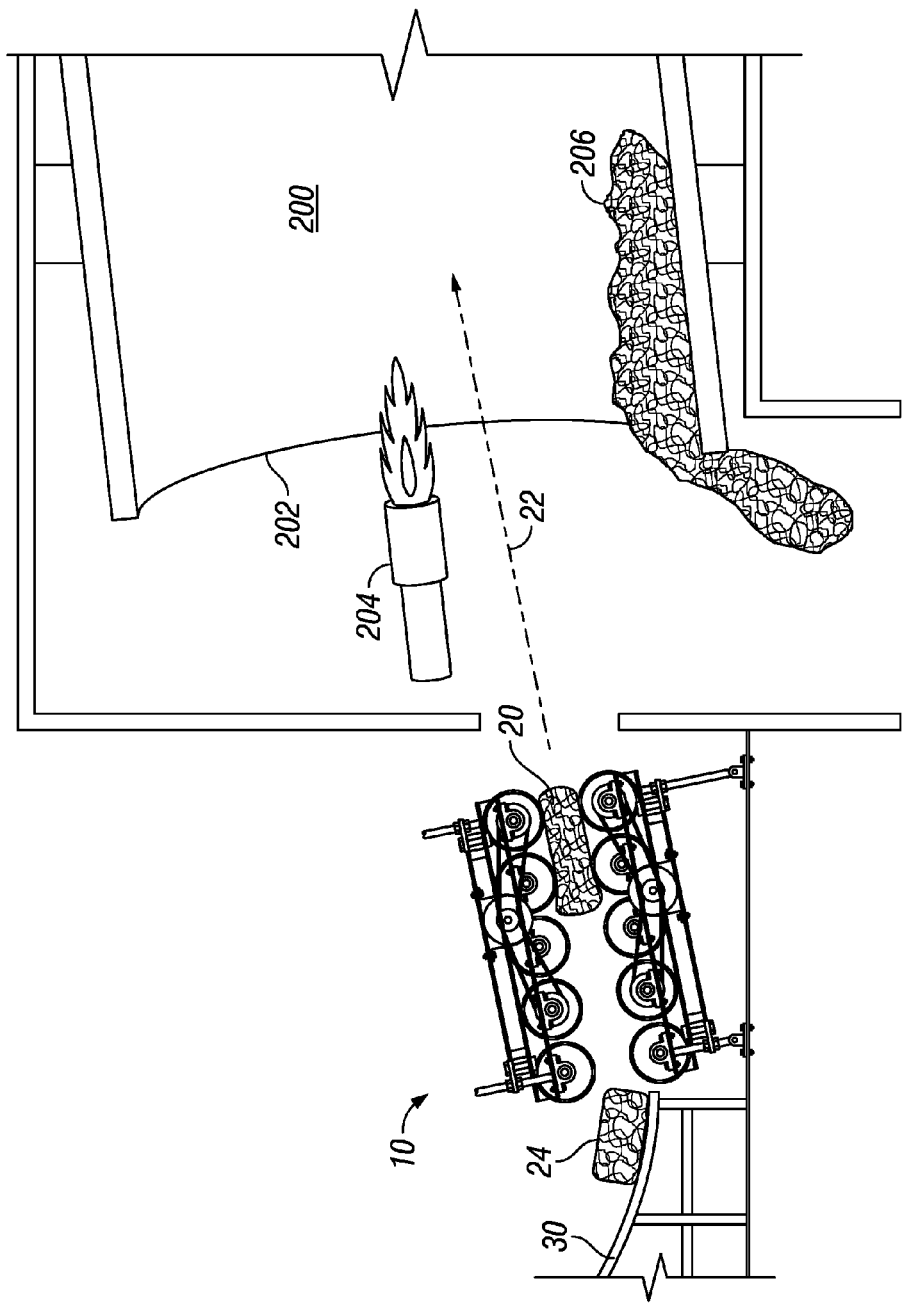
FIG. 1 illustrates an embodiment of the present invention in position adjacent the discharge end of a cement kiln.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to enable a person of ordinary skill in the art to make and use the present inventions.

DETAILED DESCRIPTION

One or more illustrative embodiments incorporating the invention disclosed herein are presented below. Not all features of an actual implementation are described or shown in this application for the sake of clarity. It is understood that the development of an actual embodiment incorporating the present invention, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicants have created a device for placing whole waste tires into the burning or combustion zone of a kiln, such as a cement kiln, by mechanically accelerating and propelling the whole waste tire into a predetermined region within the kiln along a predetermined trajectory. The device can propel whole tires of varying sizes by imparting a relatively constant exit velocity to each tire.

More specifically, FIG. 1 illustrates a device 10 according to the present invention positioned adjacent the discharge end 202 of a kiln 200. FIG. 1 shows a conventional burner pipe 204 in the discharge end 202 of the kiln 200 for supplying the necessary thermal energy to the kiln process. Also shown in FIG. 1 is cement clinker 206 being discharged from the rotary kiln 200. FIG. 1 also illustrates a whole tire 20 within the device 10 being accelerated through the device 10 for propulsion into kiln 200. The intended tire trajectory 22 is also shown. A second whole tire 24 is shown on feeding apparatus 30 as the tire 24 enters the device 10.

Figure 2:
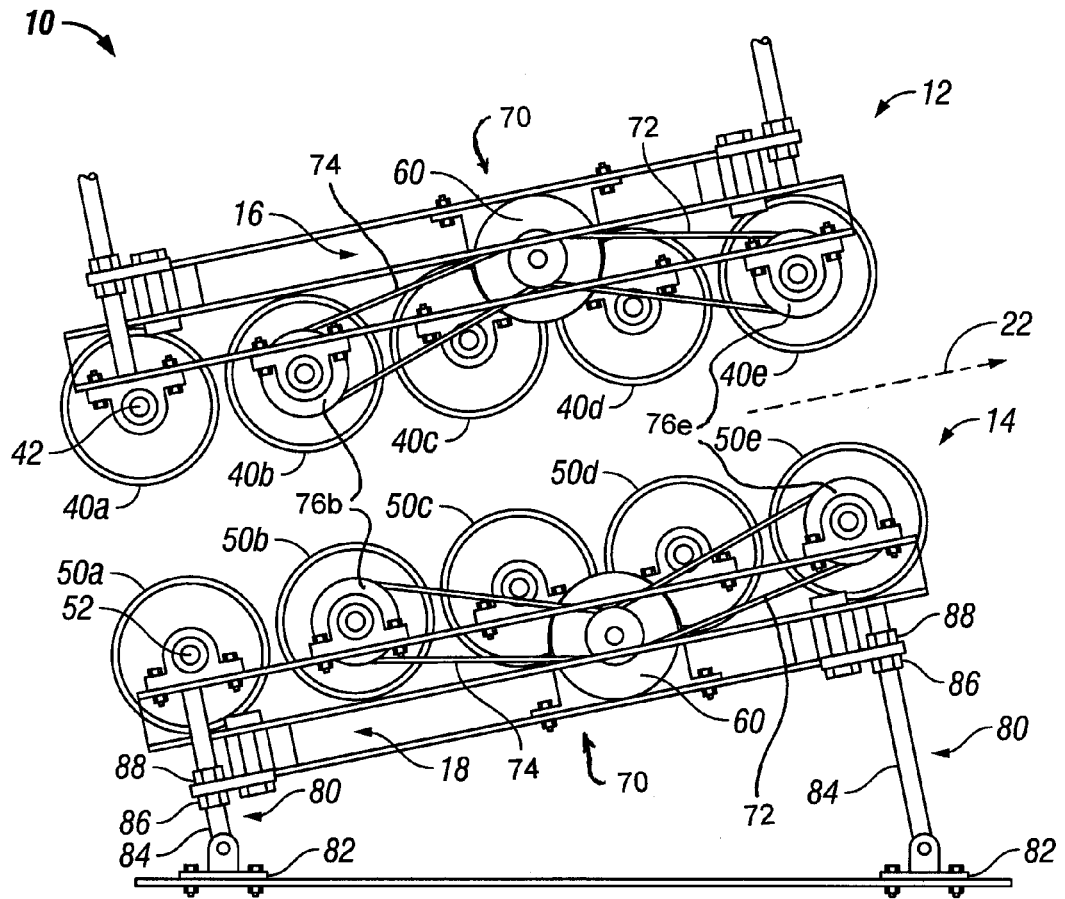
FIG. 2 illustrates a side view of the embodiment of the present invention shown in FIG. 1.

Turning to FIG. 2, the device 10 will be described in more detail. Device 10 comprises an upper accelerating assembly 12 and a lower accelerating assembly 14. Upper accelerating assembly 12 comprises a plurality, which for purposes of this disclosure is understood to mean "two or more", of rotatable elements 40. Each rotatable element 40 is disposed about a shaft 42, which is aligned substantially normal to the intended trajectory 22 of the tire. The rotatable elements 40 are aligned and affixed to an upper assembly frame portion 16 such that each rotatable element 40 can rotate relative to frame portion 16. It will be appreciated that conventional bearings and pillow blocks are suitable for this purpose.

The lower accelerating assembly 14 may be constructed similarly to the upper accelerating assembly 12, and comprises a plurality of rotatable elements 50. Each rotatable element 50 comprises a shaft 52 that is rotatably mounted to and aligned on a lower accelerating assembly frame portion 18. Again, conventional bearings and pillow blocks are suitable for this purpose. It will be appreciated the upper and lower assemblies 12.14 may be fabricated from readily available, or off-the-shelf, items, such as structural steel I-beam and/or channel beams. In a preferred embodiment, a device 10 is mostly constructed from such off-the-shelf items to hold down the cost.

As shown in FIG. 2, the upper accelerating assembly 12 and the lower accelerating assembly 14 each comprise a prime mover 60 for rotating one or more of the rotatable elements 40, 50. As shown in FIG. 2, a drive system 70 couples the prime mover 60 to rotatable elements 40b and 40e in the upper assembly 12, and rotatable elements 50b and 50e in the lower assembly 14. Not shown in FIG. 2 is another portion of the drive system 70 on the other side of device 10, which couples rotatable elements 40b and 40e with rotatable elements 40a, 40c and 40d, and elements 50b and 50e with elements 50a, 50c and 50d. Thus, in the embodiment shown in FIG. 2 the prime movers 60 drive all of the rotatable elements 40a-e and 50a-e.

In a preferred in embodiment, the drive system 70 for the device 10 comprises a series of V belts 72, 74 and pulleys 76b, 76e. V belts are preferred over toothed belts or chains because of the increased ability of a V belt drive system to slip if something should jam device 10. In a low slip drive system, such as a chain drive, a jam in device 10 may cause physical damage to one or more of the rotatable elements 40, 50.

Also shown in FIG. 2 are mounting structures 80, which mount or locate the device 10 relative to the kiln 200. In a preferred embodiment, the mounting structures 80 comprise foundation plates 82 that are attached to a concrete foundation and adjustable struts 84 for orienting and aligning the device 10 with respect to the kiln 20. These struts may comprise a plurality of threaded rods having adjustment 86 and locking nuts 88 for securing the device 10 thereto. Alternatively, the mounting structures 80 may comprise a series of hydraulic or pneumatic rams, or electric screws.

Figure 3:
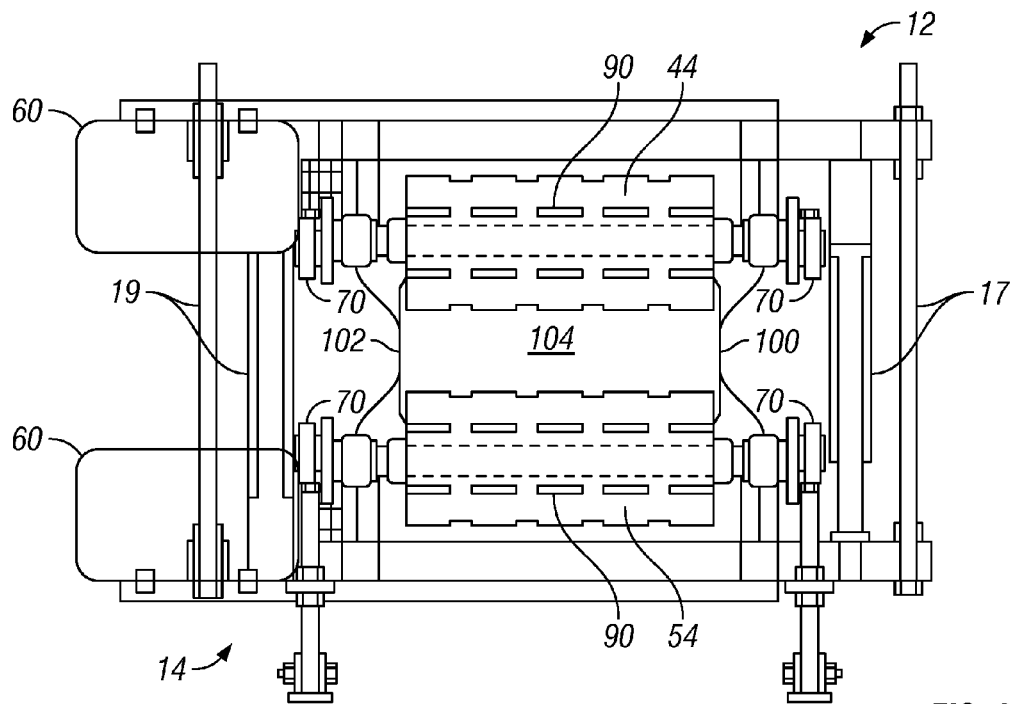
FIG. 3 illustrates an end view of the embodiment of the present invention shown in FIG. 2.

FIG. 3 illustrates and end of view of the embodiment shown in FIG. 2 showing the entrance into the device 10. In this view, the rotatable elements 40, 50 are seen to be cylinders 44, 54 having one or more gripping structures 90 on their outer circumference. The prime movers 60 for the upper and lower accelerating assemblies 12, 14 are shown as well as the drive system 70 on both sides of the rotatable elements 40, 50. Shown in FIG. 3, but not in FIG. 2, are intermediate frame portions 17, 19, which serve to space the upper accelerating assembly 12 from the lower accelerating assembly 14 by a predetermined distance. Similarly to the mounting structures 80 described previously, these intermediate frame portions 17, 19 may comprise threaded rods with adjusting and lock nuts, hydraulic or pneumatic cylinders or rams, or electric screws.

Also shown in FIG. 3, but not in FIG. 2, are guide plates 100, 102 on either side of the throat 104 formed between the upper accelerating assembly 12 and the lower accelerating assembly 14. It will be appreciated that these guide plates 100, 102 serve to prevent a tire 20 from exiting the device 10 in a direction other than the intended trajectory 22 out the discharge end of the device 10.

Figure 4:
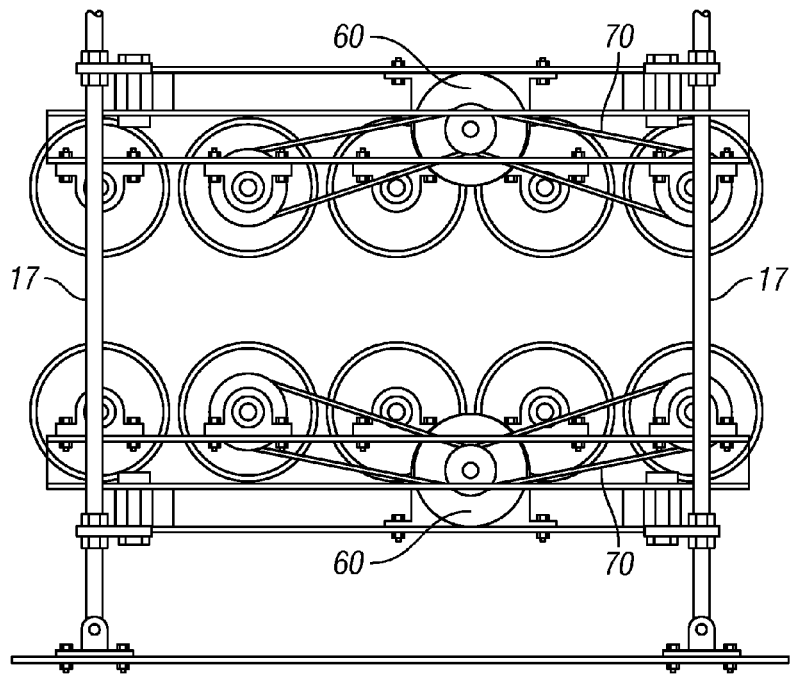
FIG. 4 illustrates a side-view of the embodiment of the present invention shown in FIG. 2.

FIG. 4 shows a side view of the device 10 similar to that shown in FIG. 2 except that the intermediate frame portions 17 are shown and the mounting structures 80 have been adjusted so that the device 10 is aligned and oriented differently than shown in FIG. 2. FIG. 4 also shows a complete drive system 70 that drives each of the rotatable elements 40, 50.

Figure 5:
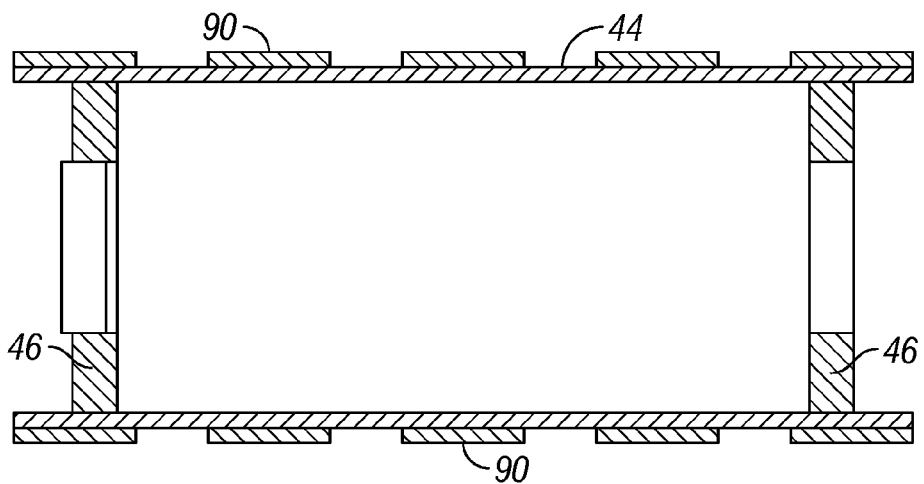
FIG. 5 illustrates a cross sectional view of a rotating drum for use with an embodiment of the present invention.

FIG. 5 illustrates a cross-sectional view of a preferred embodiment of a rotatable elements 40, 50 for use with devices 10 utilizing the present invention. The rotatable elements 40, 50 are shown to be a cylinder 44, 54 which may be fabricated from structural plate, steel tubing or other suitable materials. The cylinder 44 may have a hub 46 adjacent each end for supporting the cylinder on its shaft (not shown). Additional hubs, such a mid-span hub (not shown), may be utilized to provide additional support and rigidity. The hubs 46 may be attached the cylinder as an interference fit, by welding or by some other fixation method that is suitable for the environment to which the cylinder will be subjected. In a preferred embodiment, the length of the cylinder (i.e., the distance along the axis of rotation) is between about 1 and 1.5 times the expected diameter of the largest tire to be propelled.

Also shown in FIG. 5 is a plurality of gripping structures 90 for engaging and imparting energy to the tire 20. In a preferred embodiment, the gripping structures 90 are discrete links of square steel stock, which are pinned to the outer circumference of the cylinder 44. It will be appreciated that a variety of other gripping surfaces 90 may be employed such as a continuous length of bar stock, exposed pins or studs, or protuberances made by puddle welding. In a preferred embodiment, the gripping structures 90 are discrete lengths of square steel stock approximately five inches long, which are roll pinned to the outer circumference of the cylinder 44. Short discrete lengths of gripping structures 90 are preferred over longer lengths of gripping structures 90 because if one structure should break loose from the cylinder 44, the chances of a small gripping structure 90 causing damage to the device 10 or kiln 20 are much less than if a longer length of gripping structure broke free.

Figure 6:
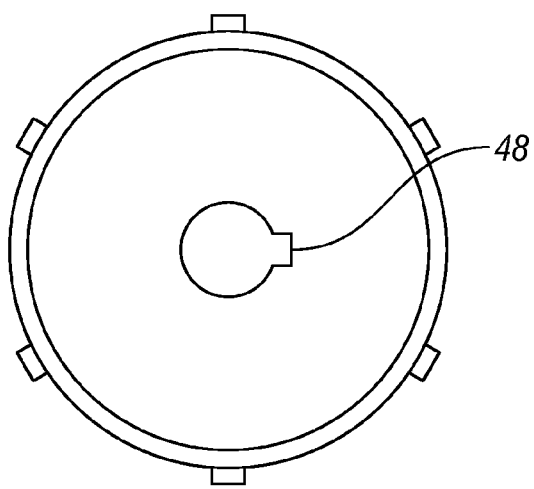
FIG. 6 illustrates an end view of the drum shown in FIG. 5.

FIG. 6 shows an end view of the preferred cylindrical rotatable element 44 for use with a device 10 according to the present invention. FIG. 6 illustrates a preferred embodiment, which shows six rows of gripping elements 90 spaced evenly about the circumference. FIG. 6 also shows a key way 48 in one of the hubs for engaging a corresponding key on the rotatable element shaft (not shown). It will be appreciated that in this embodiment the cylinder and shaft rotate together and relative to the accelerating assembly frame 12, 14. It will also be appreciated that other embodiments of present invention may use a rotatable element 40, 50 that rotates about a shaft, which shaft is fixed relative to the frame.

A desirable feature of the present invention may be that each tire exits the device 10 with approximately the same exit velocity, regardless of tire size or weight. This relatively constant velocity allows for relatively consistent placement of the tires within the kiln. It will be noted that for the embodiment described above, each rotatable element 40 was aligned over a corresponding rotatable element 50. Other embodiments incorporating the present invention may deviate from this arrangement, such as, for example, by staggering the upper and lower accelerating assemblies so that a rotatable element 40 is above and between two corresponding rotatable elements 50. Further, the drive system 70 may be adapted, such as by varying sizes of pulleys, such as 76b and 76e, to impart differing peripheral velocities to one or more rotatable elements 40, 50. For example, an embodiment of the device 10 may drive one or more of the rotatable elements at a speed or speeds slower than the final exit velocity so that the speed of the tire through the device 10 is "ramped up" to its final exit velocity.

Figure 7:
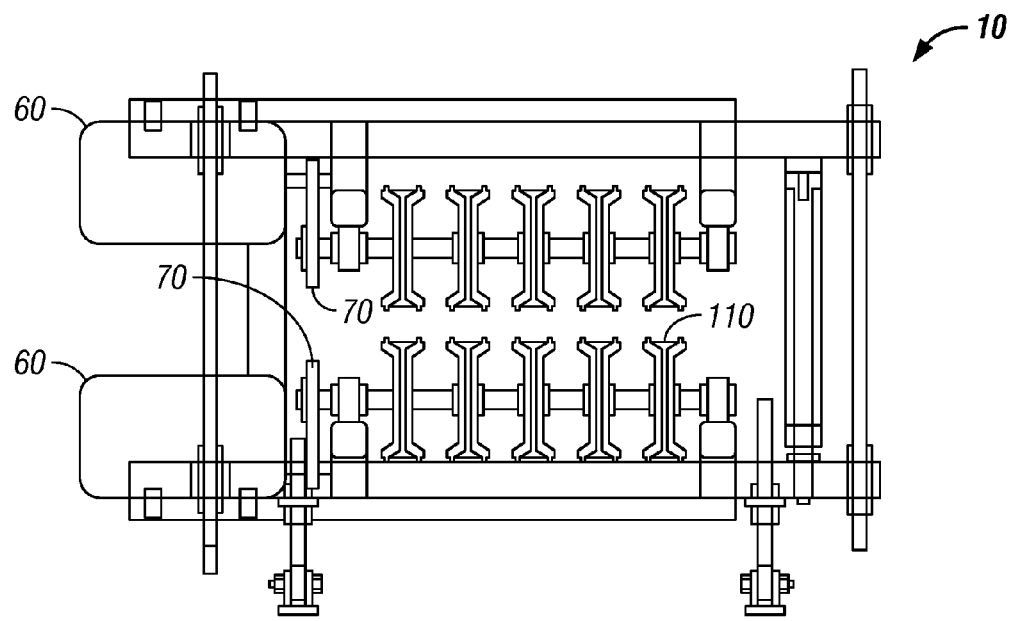
FIG. 7 illustrates an end-view of another embodiment of present invention.
Figure 8:
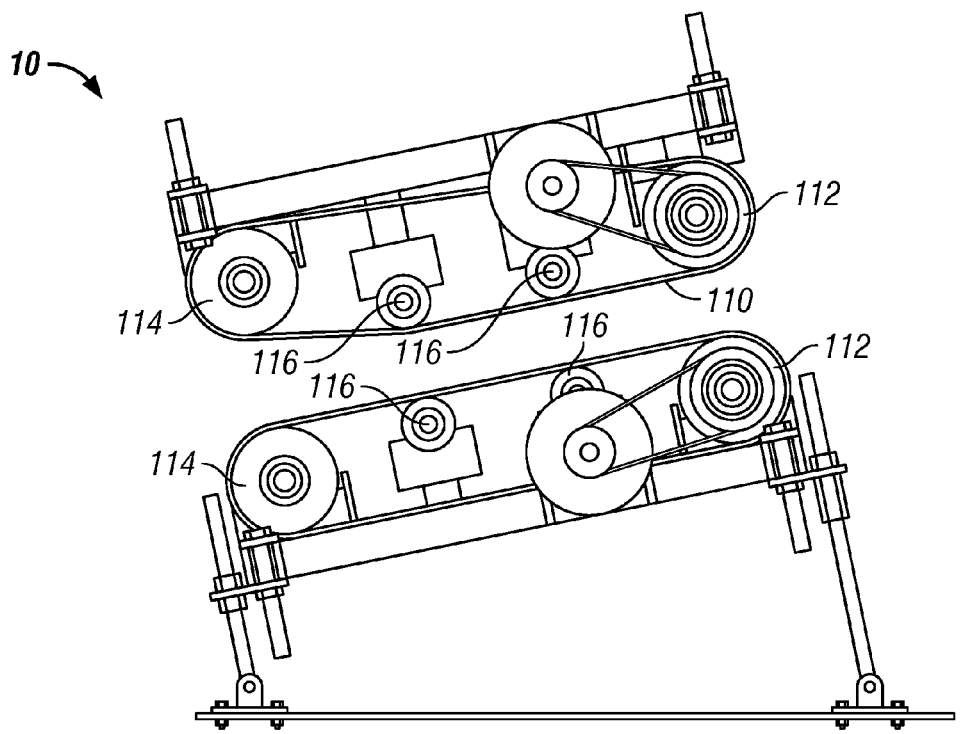
FIG. 8 illustrates a side view of the embodiment shown in FIG. 7.

Turning now to FIGS. 7 and 8, an alternative embodiment utilizing the present invention will be described. In the device 10 illustrated in FIGS. 7 and 8, the rotatable elements 40, 50 comprise a series of sprockets for driving a chain or belt system 110. As shown in FIG. 7, the upper accelerating assembly 12 comprises a plurality of belt or chain systems 110, and in a preferred embodiment, comprises five. As shown in FIG. 8, each chain or belt system 110 comprises a driven sprocket 112 and an idler sprocket 114 adjacent the entrance and exit of the device 10. Each belt system 110 also includes one or more small idler sprockets 116 for guiding the belt or chain 110. As shown in FIGS. 7 and 8, the overall structure of this embodiment may be substantially similar to the overall structure of the embodiment described in FIGS. 1 through 4. For example, the belt or chain systems 110 may be mounted on an upper accelerating assembly frame 12 and a lower accelerating assembly frame 14. In this embodiment, five rows of belts and chains are employed per accelerating assembly 12, 14. The belt or chain systems are spaced apart to provide a throat having a width of about 1 to about 1.5 times the maximum tire diameter.

This embodiment may comprise one or more prime movers 60 for imparting energy to the accelerating assemblies 12, 14. As shown in FIG. 8, it is preferred that each upper and lower rotating assembly 12, 14 has its own prime mover 60, which is coupled to the drive sprocket 112. In a preferred embodiment, this coupling takes the form of a V belt and pulley system. Also, in a preferred embodiment, the chain may comprise an ANSI 80-2 high strength non-lubricated roller chain. It will be appreciated that gripping structures 90 are preferably fixed to the chain on belt system 110 for engaging and accelerating the tire 20 through the device 10. A preferred form of gripping structure for this embodiment may comprise pieces of metal strip or cleats riveted or otherwise attached to the chain or belt.

Embodiments of the present invention, such as those described above may be designed to propel, most preferably, passenger automobile and light truck tires into the discharge end of a cement kiln through the kiln hood. Automobile and light truck tires typically have a weight range from about 15 pounds to about 50 pounds each and a dimension range from about 22 inches in diameter and about 6 inches in width to about 29 inches in diameter and about 9½ inches in width. It is preferred that the device 10 be designed to achieve a cycle rate of about 10 tires per minute with a range of about 1 tire per minute to about 20 tires per minute. It is preferred that the device 10 propel the tires along an adjustable trajectory into the kiln about 20 feet to about 90 feet. Depending on the length of any kiln cooler or how far the device 10 is displaced from the discharge end of the kiln 200, the total range of the device 10 is preferred to be from about 35 feet to about 105 feet.

The range and trajectory of the tires is preferably adjusted through control of the tire velocity as it exists the device 10. It is preferred that the trajectory of the tire be as flat as possible and more preferably for the trajectory rise above the horizon not to exceed about 11½ feet. It is also preferred that the trajectory angle of the device 10 (as shown in FIGS. 1, 2 and 8) be adjustable from about 0% to about 15% above the horizon and more preferably from about 0% to about 12%.

In a preferred embodiment, the prime movers 60 are 3 phase, 440 volt, 20 horsepower AC motors operating at about 3600 RPM. Such motors are available from a variety of sources including Baldor, catalog number EM4106P. It is also preferred that the drive system 70 comprise a V belt system such as the Browning 3VX 530 or 3VX 670 Gripnotch belt and associated pullies.

It is contemplated that an embodiment of the present invention, such as device 10, will be positioned adjacent the discharge end of a kiln 200 and located such that a whole tire 20 can be propelled to a preferred location within the combustion zone of the kiln. In design and operation of the kiln system, the operator will adjust the orientation of device 10 and the speed of the acceleration assemblies 12, 14 to achieve the desired tire placement. In a preferred embodiment, the 3 phase AC motors are controlled by conventional variable frequency drives and, therefore, the speed of the accelerating assemblies 12,14 and other parameters may be adjusted to achieve the desire tire placement. Once the proper orientation of the device 10 with respect to the kiln 200 has been achieved, the device 10 may be fixed to the kiln plant foundation for continued service, such as by the mounting structures 80 described above.

In another embodiment, the device 10 may be presented to its location adjacent to discharge end of the kiln 200 on a track system, wheel system or other such system that allows the device 10 to be both rigidly locked in place and released and easily moved out of the way. Such an embodiment facilitates periodic repair and maintenance of device 10. Further, because the construction materials used in device 10 are relatively common and inexpensive, a plant operator may chose to build a redundant device 10 so that when one device is in use, the other is undergoing periodic maintenance. The track system of such an embodiment allows the device 10 to be easily installed and removed from its location adjacent kiln 200.

A device 10 according to the present invention may be supplied with whole waste tires in any number of ways. For example, tires may be hand fed into device 10. In such an embodiment, a feed shoot or table is preferred to aid the introduction of the whole tire into the device 10. Alternatively, a feed apparatus 30 (FIG. 1), such as a shoot or conveyor may be used to automatically supply tires at a given interval to device 10. In still other embodiments, a computer or other programmable logic controller may control the device 10. For example, the controller could control (i) the speed of the prime movers 60 and, therefore, the exit velocity of the propelled tires, or (ii) the mounting structures 80, such as hydraulic rams or electric screws. In addition, the logic device may be used to control a gate assembly on the feeding apparatus 70 to present tires to the device 10 at the appropriate intervals. Also, the feeding apparatus 70 may comprise a weight measurement device so that each tire is weighed prior to entry into the device 10. In this fashion, the amount of tires fed into the process can be based on weight, which is indicative of energy value, as opposed to merely based on the number of tires per minute.

Another embodiment may incorporate a thermal-imaging system or other type system, "see" where the tire lands within the kiln. By interfacing such systems into the logic controller, the controller can continually adjust one or more of the parameters of the device 10, as needed, to place the tires at the desired location within the kiln. In these embodiments, the computer or logic controller may interface with and control all of these or only some of these parameters. It will also appreciated that a device according to the present invention may be implemented without such refinements.

Lastly, while the preferred embodiments of the present invention are adapted for use automobile tires and light truck tires, it will be appreciated that the device 10 disclosed herein may be modified to accept or propel any size tire. Indeed, a logic controller as described above, may be readily incorporated to adjust the throat of the device 10 to accommodate tires of differing sizes by adjusting hydraulic or pneumatic rams or electric screws, such as those that may be used for intermediate members 17.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

What is claimed is:

1. A method for burning whole tires in a kiln, comprising:
   providing a kiln having an inlet end, a discharge end and a burning zone there between;
   providing a cement clinker feedstock at the inlet end;
   rotating the kiln so that the feedstock works its way toward the discharge end;
   providing a device for propelling whole waste tires in line with the kiln and displaced a first predetermined distance from the kiln discharge end, the device comprising:
      a lower accelerating assembly comprising a plurality of rotatable elements, each element having an axis of rotation substantially normal to an intended flight path of a tire;
      an upper accelerating assembly comprising a plurality of rotatable elements, each element having an axis of rotation substantially normal to an intended flight path of the tire and associated with a rotatable element in the lower assembly;
      at least one prime mover for supplying rotational energy to the upper and lower accelerating assemblies and for rotating in opposite directions a plurality of the upper elements and a plurality of the associated lower elements;
      a frame having a lower portion supporting the lower accelerating assembly, an upper portion supporting the upper accelerating assembly and an intermediate portion for locating the upper assembly a second predetermined distance from the lower assembly so that the tire is accelerated by the oppositely rotating elements and propelled substantially along a predetermined trajectory;
      a drive system adapted to impart differing velocities to at least two of the plurality of associated rotatable elements in the upper and lower assemblies; and
      a control system for the at least one prime mover adapted to control the velocities of the rotatable elements;
   feeding the tire into the device;
   driving at least two of the plurality of associated rotatable elements at differing velocities at the same time so that the tire is accelerated to its final exit velocity as it is propelled along the lower and upper assemblies by contact with the associated rotatable elements at least two of which have differing velocities;
   propelling the tire from the device across the first predetermined distance and into the kiln discharge end so that the tire lands within a predetermined region within the burning zone; and
   burning the tire within the kiln.

2. The method of claim 1, further comprising adjusting the control system so that a second tire is propelled along a trajectory that is different than the trajectory of the first tire.

3. The method of claim 1, further comprising adjusting the control system so that a second tire is propelled to land in a region that is different than the region in which the first tire lands.

4. The method of claim 1, wherein the tire is a whole automobile or a light truck tire.

5. The method of claim 1, wherein the predetermined region is the burning zone of the kiln.

6. The method of claim 1, wherein the rotatable element comprising cylinders having gripping structures on the outer circumference of the cylinders.

\* \* \* \* \*